United States Patent
Huang

(10) Patent No.: US 10,433,369 B2
(45) Date of Patent: Oct. 1, 2019

(54) POWER SUPPLY CONTROL METHOD BASED ON MOBILE POWER SOURCES

(71) Applicant: GUANGDONG FLEXWARM ADVANCED MATERIALS & TECHNOLOGY CO., LTD., Guangzhou, Guangdong (CN)

(72) Inventor: Weicong Huang, Guangdong (CN)

(73) Assignee: GUANGDONG FLEXWARM ADVANCED MATERIALS & TECHNOLOGY CO., LTD., Guangzhou (CN)

( * ) Notice: Subject to any disclaimer, the term of this patent is extended or adjusted under 35 U.S.C. 154(b) by 137 days.

(21) Appl. No.: 15/740,820

(22) PCT Filed: Mar. 26, 2016

(86) PCT No.: PCT/CN2016/077444
§ 371 (c)(1),
(2) Date: Dec. 29, 2017

(87) PCT Pub. No.: WO2017/000597
PCT Pub. Date: May 1, 2017

(65) Prior Publication Data
US 2018/0192473 A1 Jul. 5, 2018

(30) Foreign Application Priority Data

Jun. 30, 2015 (CN) .......................... 2015 1 0377011

(51) Int. Cl.
*H05B 1/02* (2006.01)
*H02J 7/00* (2006.01)

(52) U.S. Cl.
CPC .................. *H05B 1/02* (2013.01); *H02J 7/00* (2013.01); *H02J 7/0031* (2013.01); *H02J 7/0063* (2013.01); *H05B 1/0272* (2013.01)

(58) Field of Classification Search
CPC .. H05B 1/02; H05B 1/0272; H02J 7/00; H02J 7/0031; H02J 7/0063
See application file for complete search history.

(56) References Cited

FOREIGN PATENT DOCUMENTS

| CN | 104578264 A | 4/2015 |
|---|---|---|
| CN | 204374802 U | 6/2015 |

*Primary Examiner* — Robert L Deberadinis

(57) ABSTRACT

The invention provides a power supply control method based on mobile power sources, comprising a single-chip microcomputer capable of inputting a pulse voltage to a heating circuit and two different control methods: in one method the pulse voltage is controlled to be turned on or off by detecting the current A of the heating circuit; in other method the pulse voltage is turned off when the temperature is detected to reach the preset temperature so as to keep the heating circuit to be activated continuously; even though universal-used mobile power sources are employed by the heating circuit, the mobile power sources doesn't enter a hibernation state; a pulse voltage signal is added to the heating circuit, thus the mobile power sources are continuously activated, ensuring normal operation of the heating circuit and providing significant convenience to the user's use.

11 Claims, 2 Drawing Sheets

POWER SUPPLY CONTROL METHOD BASED ON MOBILE POWER SOURCES

FIELD OF THE INVENTION

The invention relates to the technical field of circuit control, in particular to a power supply control method based on mobile power sources.

BACKGROUND OF THE INVENTION

Electric appliances provided with mobile power supplies provide great convenience for people, however, existing electric appliances provided with mobile power supplies use specially-made power supplies as built-in power supplies, which has the disadvantage that when the specially-made power supplies break down, the electric appliances cannot be adaptive to universal mobile power supplies on the market for the reason that hibernation electric current restraints are set for the universal power supplies on the market, namely under the condition that the operating electric current is continuously smaller than a specific electric current value in one minute, the mobile power supplies can stop operating when a preset temperature or a set operating state is reached and the output power needs to be reduced, switches of the mobile power supplies need to be turned on manually for activating the mobile power supplies, which would severely affect user experience.

In addition, intelligent controlled heating is the development tendency in the technical field of electric heating products (such as electric blankets and electric heating clothes). Intelligent controlled heating can achieve the goal of energy-saving, and meanwhile provide more comfortable temperature environments for people; however, the universal mobile power supplies cannot be used for the electric heating products further restrains the development of the electric heating products.

SUMMARY OF THE INVENTION

The invention aims to overcome the defects of the prior art and provides a control method which can prevent the mobile power sources from entering a hibernation state when the temperature of the heating circuit reaches a preset temperature value or decreases.

In order to solve the above technical problems, the control method of the present invention comprises a single-chip microcomputer capable of inputting a pulse voltage to a heating circuit and the following control steps that:

(a). switching on the mobile power sources and enabling the heating circuit to start heating up;

(b). detecting the electric current with an electric current A detection device: if the electric current A is greater than a hibernation electric current A0, enabling the heating circuit to continue heating up; if the electric current A is smaller than the hibernation electric current A0, proceeding to step (c);

(c). keeping the mobile power sources in the activated state by making the single chip microcomputer send a pulse voltage lasting for a time period t2 to the heating circuit every time period t1, and repeating the step (b);

(d). enabling the heating circuit to stop heating when the temperature reaches the preset value and then repeating the step (b).

Besides the above control method, the present invention further provides another power supply control method based on the mobile power sources, and the control method comprises a single-chip microcomputer capable of inputting a pulse voltage to a heating circuit and the following control steps that:

(a). switching on the mobile power sources and enabling the heating circuit to start heating up;

(b). detecting the temperature T of the heating zone with a temperature detection device: if the temperature T is smaller than the preset temperature T0, enabling the heating circuit to continue heating up; if the temperature T is greater than the preset temperature T0, reducing the output voltage of the mobile power sources and proceeding to the step (c).

(c). keeping the mobile power sources in the activated state by making the single chip microcomputer send a pulse voltage lasting for a time period t2 to the heating circuit every time period t1, and repeating the step (b).

Furthermore, the time period t1 is 1-30 s, and the time period t2 is 0.1-1 s.

Furthermore, the current A0 is 10-20 mA.

Furthermore, the electric current detection device is a single-chip microcomputer.

Furthermore, the temperature T is set through initializing the control circuit board or a Bluetooth communication module.

Furthermore, in the step (b), if the electric current A is equal to the hibernation electric current A0, enabling the heating circuit to continue heating up.

Furthermore, in the step (b), if the electric current A is equal to the hibernation electric current A0, proceeding to the step (c).

Furthermore, in the step (b), if the temperature T is equal to the preset temperature T0, enabling the heating circuits to continue heating up.

Furthermore, in the step (b), if the temperature T is equal to the preset temperature T0, proceeding to the step (c).

Compared with the prior art, by adoption of the power supply control method based on the mobile power sources of the present invention, the phenomenon of the mobile power sources entering a hibernation state does not occur even when the mobile power sources in wide use is employed to supply power; specifically, by adding a pulse voltage signal to the heating circuit, the mobile power sources are continuously activated, thus ensuring normal operation of the heating circuit and providing the greatest degree of convenience for users.

DETAILED DESCRIPTION OF PREFERRED EMBODIMENTS

A further detailed description of the invention is given with accompanying drawings and specific embodiments as follows.

Figure 1:
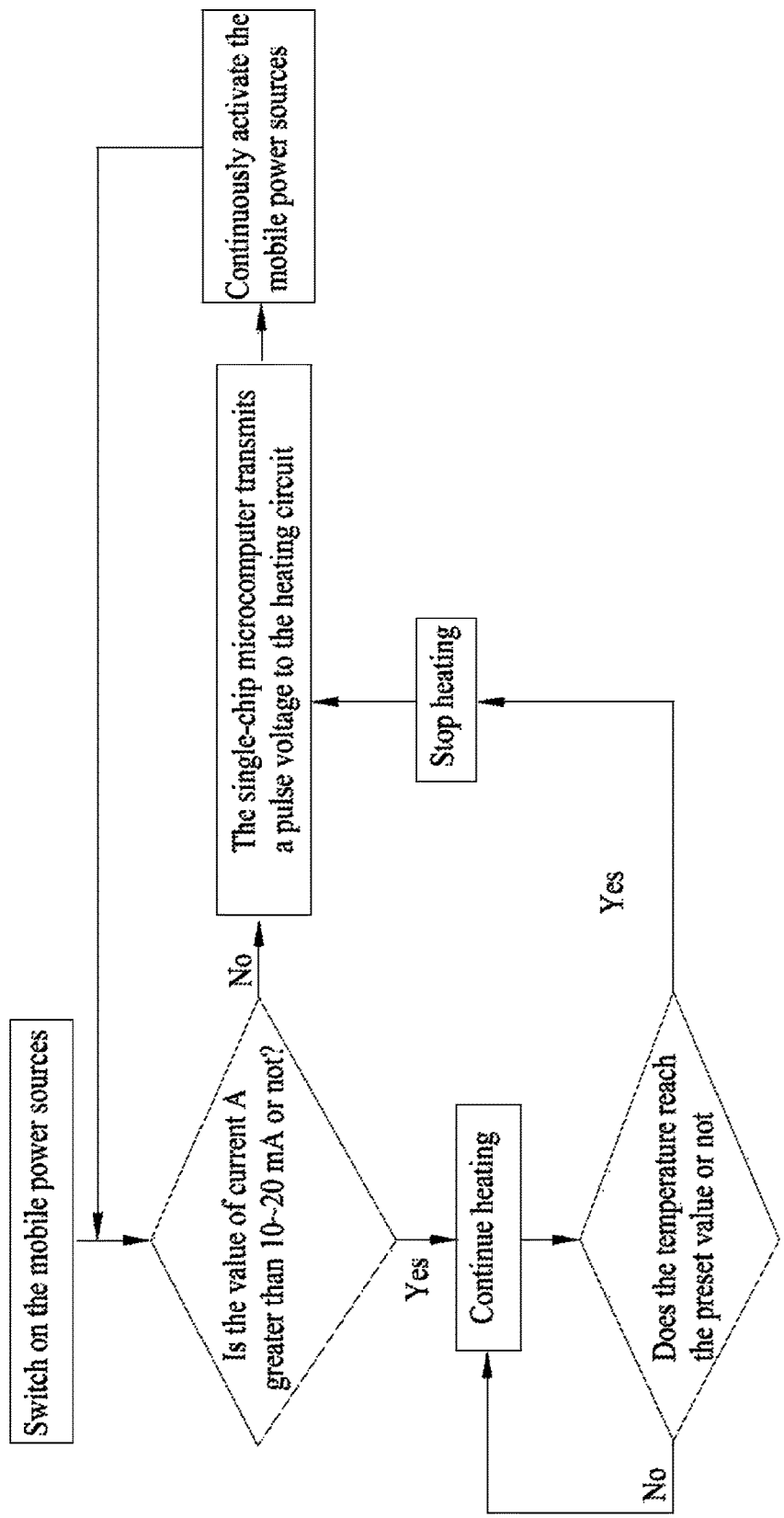
FIG. 1 is a block diagram of steps in one embodiment of the invention.

As is shown in FIG. 1, the first embodiment of the invention provides a power supply control method based on mobile power sources, which comprises a single-chip microcomputer capable of inputting a pulse voltage to a heating circuit and comprises the following control steps that:

(a). switching on the mobile power sources and enabling the heating circuit to start heating up;

(b). detecting the electric current with an electric current A detection device: if the electric current A is greater than a hibernation electric current A0, enabling the heating circuit to continue heating up; if the electric current A is smaller than the hibernation electric current A0, proceeding to step (c);

(c). keeping the mobile power sources in the activated state by making the single chip microcomputer send a pulse voltage lasting for a time period t2 to the heating circuit every time period t1, and repeating the step (b);

(d). enabling the heating circuit to stop heating when the temperature reaches the preset value and then repeating the step (b).

The magnitude of the electric current A at the current moment can be determined by detecting the current output voltage through the single-chip microcomputer, preferably, an electric current detection program is written in the single-chip microcomputer, and the electric current value at the current moment is detected by the electric current detection program, thus avoiding an external electric current detection circuit, and effectively reducing the size and the manufacturing cost of products.

According to the operating principle of the embodiment, a switch is pressed down first to make the heating circuit be powered on, and at the moment, the electric current detection program can detect the magnitude of the electric current in the heating circuit; when the magnitude of the electric current at the current moment detected is smaller than 10-20 mA, the single-chip microcomputer in the heating circuit transmits a pulse voltage lasting for 0.1-1 s to the heating circuit every 1-30 s so as to activate the mobile power sources, and thus preventing the mobile power sources from entering a hibernation state; when the magnitude of the electric current at the current moment detected is greater than 10-20 mA, the single-chip microcomputer does not transmit a pulse voltage temporarily, and the heating circuit continues to perform heating. However, when the temperature reaches a preset temperature value, the single-chip microcomputer decreases the output power, and thus reducing the magnitude of the electric current in the heating circuit; the single-chip microcomputer transmits a pulse voltage to the heating circuit to make the mobile power sources continue to operate only when the magnitude of the electric current is smaller than 10-20 mA, and thus the temperature is kept within the range of the preset temperature.

Figure 2:
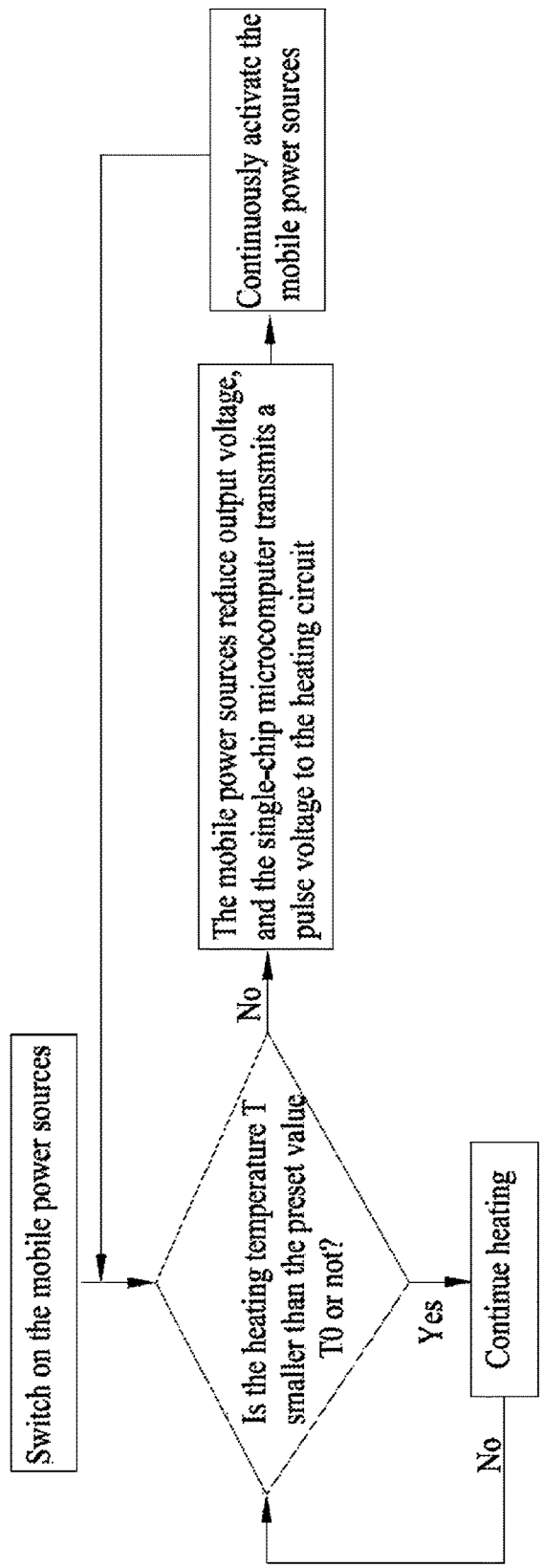
FIG. 2 is a block diagram of steps in another embodiment of the invention.

As is shown in FIG. 2, the invention further provides another power supply control method based on the mobile power sources, which comprises a single-chip microcomputer capable of inputting a pulse voltage to a heating circuit and the following control steps that:

(a). switching on the mobile power sources and enabling the heating circuit to start heating up;

(b). detecting the temperature T of the heating zone with a temperature detection device: if the temperature T is smaller than the preset temperature T0, enabling the heating circuit to continue heating up; if the temperature T is greater than the preset temperature T0, reducing the output voltage of the mobile power sources and proceeding to the step (c).

(c). keeping the mobile power sources in the activated state by making the single chip microcomputer send a pulse voltage lasting for a time period t2 to the heating circuit every time period t1, and repeating the step (b).

According to the control method in the embodiment, the preset temperature is used as a node for pulse starting, so that the operability of the product is richer, and control is easier and more convenient.

In addition, since products using mobile power sources as their power supply, whose temperature can only be adjusted through gears, and cannot specifically set the right temperature for the user; however, the temperature of the present invention could be set as a value adjusted to the needs of the user by initializing the control circuit. Moreover, a Bluetooth receiving and sending module can be further arranged in the heating circuit, and a Bluetooth device is made in communication with the Bluetooth receiving and sending module in the heating circuit so that the temperature value can be set through the Bluetooth device.

Since the mobile power sources in wide use instead of a specially-made power supply is employed to supply power in the present invention, the universality of a heating product is greatly improved; furthermore, to prevent the mobile power sources from entering the hibernation state, a pulse voltage signal is added to the heating circuit, thus the mobile power sources are continuously activated, ensuring normal operation of the heating circuit, and therefore, avoiding the mobile power sources being frequently turned on or off, which provides significant convenience to the user's use.

Changes and modifications of the above embodiments can be made by those skilled in the field according to the disclosure and illustration in the above description. Therefore, the invention is not limited to the specific embodiments disclosed and described above, and certain modifications and changes of the invention also should be within the protection scope of the claims of the invention. Furthermore, although certain specific terms are used in the description, these terms are only used for a convenient explanation and do not limit the invention at all.

What is claimed is:

1. A power supply control method based on mobile power sources, comprising the following steps:
    (a) switching on the mobile power sources and enabling the heating circuit to start heating up;
    (b) detecting the electric current with an electric current A detection device: if the electric current A is greater than a hibernation electric current A0, enabling the heating circuit to continue heating up; if the electric current A is smaller than the hibernation electric current A0, proceeding to step (c);
    (c) keeping the mobile power sources in the activated state by making the single chip microcomputer send a pulse voltage lasting for a time period t2 to the heating circuit every time period t1, and repeating the step (b);
    (d) enabling the heating circuit to stop heating when the temperature reaches the preset value and then repeating the step (b).

2. The power supply control method based on the mobile power sources according to claim 1, wherein the time period t1 is 1-30 s, and the time period t2 is 0.1-2 s.

3. The power supply control method based on the mobile power sources according to claim 1, wherein the current A0 is 10-20 mA.

4. The power supply control method based on the mobile power sources according to claim 1, wherein the electric current detection device is a single-chip microcomputer.

5. The power supply control method based on the mobile power sources according to claim 1, wherein in the step (b), if the electric current A is equal to the hibernation electric current A0, enabling the heating circuit to continue heating up.

6. The power supply control method based on the mobile power sources according to claim 1, wherein in the step (b), if the electric current A is equal to the hibernation electric current A0, proceeding to the step (c).

7. A power supply control method based on the mobile power sources, comprising the following steps:

(a) switching on the mobile power sources and enabling the heating circuit to start heating up;

(b) detecting the temperature T of the heating zone with a temperature detection device: if the temperature T is smaller than the preset temperature T0, enabling the heating circuit to continue heating up; if the temperature T is greater than the preset temperature T0, reducing the output voltage of the mobile power sources and proceeding to the step (c);

(c) keeping the mobile power sources in the activated state by making the single chip microcomputer send a pulse voltage lasting for a time period t2 to the heating circuit every time period t1, and repeating the step (b).

8. The power supply control method based on the mobile power sources according to claim 7, wherein the temperature T is set through initializing the control circuit board or a Bluetooth communication module.

9. The power supply control method based on the mobile power sources according to claim 7, wherein in the step (c), if the temperature T is equal to the preset temperature T0, enabling the heating circuit to continue heating up.

10. The power supply control method based on the mobile power sources according to claim 7, wherein in the step (b), if the temperature T is equal to the preset temperature T0, proceeding to the step (c).

11. The power supply control method based on the mobile power sources according to claim 7, wherein the time period t1 is 1-30 s, and the time period t2 is 0.1-2 s.

* * * * *